US008527590B2

(12) United States Patent
Tapolcai et al.

(10) Patent No.: US 8,527,590 B2
(45) Date of Patent: Sep. 3, 2013

(54) SOLVING MIXED INTEGER PROGRAMS WITH PEER-TO-PEER APPLICATIONS

(76) Inventors: Janos Tapolcai, Budapest (HU); Pin-Han Ho, Waterloo (CA)

(*) Notice: Subject to any disclaimer, the term of this patent is extended or adjusted under 35 U.S.C. 154(b) by 591 days.

(21) Appl. No.: 12/015,499

(22) Filed: Jan. 16, 2008

(65) Prior Publication Data
US 2009/0182814 A1    Jul. 16, 2009

(51) Int. Cl.
*G06F 15/16* (2006.01)
*G06F 9/46* (2006.01)
*G06F 9/45* (2006.01)

(52) U.S. Cl.
USPC ............ 709/205; 709/202; 709/207; 718/106

(58) Field of Classification Search
USPC ................. 709/202–207; 718/106; 717/149; 705/7–11
See application file for complete search history.

(56) References Cited

U.S. PATENT DOCUMENTS

| | | | | |
|---|---|---|---|---|
| 7,075,892 B2* | 7/2006 | Grover et al. | ................. | 370/238 |
| 7,096,251 B2* | 8/2006 | Chiu et al. | ..................... | 709/202 |
| 7,174,381 B2* | 2/2007 | Gulko et al. | ................... | 709/226 |
| 7,197,536 B2* | 3/2007 | Beukema et al. | ............. | 709/205 |
| 7,236,939 B2* | 6/2007 | Chen et al. | ......................... | 705/9 |
| 7,305,363 B1* | 12/2007 | Sandholm et al. | .............. | 705/37 |
| 7,418,470 B2* | 8/2008 | Howard et al. | ..................... | 709/201 |
| 7,529,767 B2* | 5/2009 | DeAnna et al. | ....................... | 1/1 |
| 7,577,721 B1* | 8/2009 | Chen | .............................. | 709/219 |
| 7,577,750 B2* | 8/2009 | Shen et al. | ..................... | 709/231 |
| 7,607,130 B2* | 10/2009 | Singh et al. | .................... | 718/100 |
| 7,620,680 B1* | 11/2009 | Lamport | ........................ | 709/201 |
| 7,627,632 B2* | 12/2009 | Douceur et al. | .............. | 709/205 |
| 7,627,864 B2* | 12/2009 | Du et al. | ........................ | 717/151 |
| 7,634,384 B2* | 12/2009 | Eryurek et al. | ................ | 702/182 |
| 7,646,785 B2* | 1/2010 | Mosko et al. | .................. | 370/461 |
| 7,647,590 B2* | 1/2010 | Archer et al. | .................. | 718/100 |
| 7,653,522 B2* | 1/2010 | Peralta et al. | ...................... | 703/6 |
| 7,668,910 B2* | 2/2010 | Dinges et al. | ................. | 709/204 |
| 7,707,580 B2* | 4/2010 | Kubota | ......................... | 718/105 |
| 7,827,557 B2* | 11/2010 | Zhu et al. | ....................... | 718/104 |
| 7,865,582 B2* | 1/2011 | Santos et al. | ................... | 709/223 |
| 8,051,396 B2* | 11/2011 | Beerel et al. | .................. | 716/104 |

(Continued)

FOREIGN PATENT DOCUMENTS

GB    1362910    8/1974
JP    62242279 A  * 10/1987

(Continued)

OTHER PUBLICATIONS

T.K.R., L. Ladanyi, and M.J. Saltzman, "Parallel Branch, Cut, and Price for Large-scale Discrete Optimization", Mathematical Programming 98 (2003), 253.

(Continued)

*Primary Examiner* — Melvin H Pollack
(74) *Attorney, Agent, or Firm* — Norton Rose Fulbright Canada LLP

(57) ABSTRACT

The present invention discloses methods of solving mixed integer programs (MIP) in distributed environments, where the number of computers or users involved in the optimization can be extremely high. The proposed methods are designed to be robust in order to cope with all the difficulties in public and heterogeneous environments including load balancing and privacy. The present invention also describes a market on computation power.

42 Claims, 10 Drawing Sheets

(56) References Cited

U.S. PATENT DOCUMENTS

| | | | |
|---|---|---|---|
| 2006/0074704 A1* | 4/2006 | Shukla et al. | 705/1 |
| 2006/0112049 A1 | 5/2006 | Mehrotra et al. | |
| 2007/0245273 A1* | 10/2007 | Catthoor et al. | 716/2 |
| 2009/0089789 A1* | 4/2009 | Faltings et al. | 718/104 |
| 2009/0228417 A1* | 9/2009 | Rothberg | 706/46 |

FOREIGN PATENT DOCUMENTS

| | | | |
|---|---|---|---|
| WO | WO 03003259 A2 * | 1/2003 | |
| WO | WO 2007098349 A2 * | 8/2007 | |
| WO | WO 2010000076 A1 * | 1/2010 | |

OTHER PUBLICATIONS

Qun Chen, Michael Ferris and Jeff Linderoth, "FATCOP 2.0: Advanced features in an opportunistic mixed integer programming solver", Data Mining Institute Technical Report 99-11, Computer Sciences Department, University of Wisconsin, Madison, Wisconsin, 1999.

A. A. Chlen, B. Calder, S. Elbert, and K. Bhatia, "Entropia: architecture and performance of an enterprise desktop grid system," Journal of Parallel and Distributed Computing, vol. 63, No. 5, pp. 597-610, 2003.

* cited by examiner

SOLVING MIXED INTEGER PROGRAMS WITH PEER-TO-PEER APPLICATIONS

FIELD OF THE INVENTION

The present invention relates to solving computationally complex problems. More specifically, the present invention relates to solving mixed integer programs using optimally administered distributed networks communicating via peer to peer protocols.

BACKGROUND OF INVENTION

Mixed integer programming is a widely accepted method in formulating and optimizing complex business, engineering or any complex discrete optimization problems. Mixed integer programming is a modeling language of optimization, which is general enough to cover a very wide range of optimization problems, however due to its mathematical nature most of the unsolved problems that impede the spread of GRID, cluster and desktop GRID networks can be handled. The current peer-to-peer (P2P) networks may connect an extremely high number of public computers with very heterogeneous computational performance. Mixed-integer program is a restricted from of mathematical program [5], where some of the variables are required to be integer-valued. Note that, in prior art publications this term implied the mathematical program was otherwise linear. The definition of Mixed-integer programs (MIP) used in the present invention is the following:

$$\text{MIP:Min} f(\underline{x})$$

$$g(\underline{x}) \geq 0$$

where x are the decision variables (some or the entire decision variables can take only integer solution), an $f$ is a real valued objective function that is a mathematical function on the decision variables, and g are real-valued functions, called constraints. The goal of optimization is to find values for each decision variable such that the objective function is minimal. There are three main groups of MIP:

MILP: Mixed integer linear program, where the constraints and the object function are linear functions of x.
MINLP: Mixed integer nonlinear program, where the constraints and the object function can be any functions of x.
MIQP: Mixed integer quadratic program, where the constraints are linear functions of x. And the object function is in the form of $x^T Q x + c^T x$.

In terms of complexity all of these problems belong to the NP-hard class, and thus with Karp-reduction the problems can be reduced to each other. Their classical solution method is a tree-search branch-and-bound algorithm in which each tree node represents a program, where the integer constraint are eliminated (called relaxed problem).

The present invention, in one aspect thereof, deals with mixed integer programs that are solved by branch-and-bound or branch-and-cut algorithms.

Solving MIP with Branch and Bound (BB) Algorithm

The branch and bound (BB) algorithm is a recursive search method, where in each step of the recursion the solution space is partitioned into several smaller sub-problems that are either solved or further partitioned into smaller sub-problems in the next step of the recursion. During the recursions a searching tree (called BB tree) is built up until all sub-problems are solved. In MIP solvers each node of the search tree is itself an MIP problem. In the bounding phase, the MIP problem of the node is relaxed (integer constraints are relaxed to simple bound constraints) and the relaxed problem is solved [1,2,3]. Obviously, the solution of the relaxed problem is a lower bound on the solution of the corresponding MIP. Any feasible integer solution is an upper bound on the cost of the original MIP. The feasible integer solution might be derived from the solution of the relaxed problem with some state-of-the-art heuristics.

In the branching phase, first the solution is tested to determine if the integer constraints can be satisfied. If there is any variable that violates the integer constraints, it is selected to generate two sub-problems in the branching phase each with an extra constraint that precludes the current infeasible solution. Formally, if the integer variable x has a non-integer solution f the constraint $x \leq \lfloor f \rfloor$ or $x \geq \lceil f \rceil$ is added to the original MIP problem forming the two new sub-problems. In such a way all integer solutions are feasible in one of the sub-problems. Obviously branching generates an exponential number of sub-problems that need to be processed in order to solve the original problem. Sub-problems can be discarded (or fathomed) if (1) the sub-problem has an integer solution, (2) the sub-problem is infeasible, or (3) the linear sub-problem has worse objective value than a currently available best integer solution (bounding) [4]. Every sub-problem, which can not be fathomed and were not solved need to be processed later, and called active nodes of the search tree.

Mixed Integer Linear Program (MILP)

Mixed Integer Linear Program is known for its flexibility in formulating combinatorial optimization problems. MILP solvers can solve a great selection of algorithmic problems, even NP-complete (intractable) ones. Obviously the runtime of the MILP solver is thus exponential compared to the size of input. An MILP consists of a Linear Program (LP), which is the minimization of a linear function subject to linear constraints, and some or all of the variables should be integer. Any LP can be solved efficiently (in polynomial computational time). In the MILP solvers LP-based branch and bound algorithms are implemented.

The efficiency of LP-based branch and bound strongly depends on the gap between the solution of the MILP and the relaxed problem [1,2,3]. The gap is small, if the relaxation is tight and the relaxed constraints closely approximate the feasible integer region. The LP relaxations can be tightened by adding inequalities (called cutting planes) that are valid for the original MILP. To improve the efficiency of branch and bound algorithms, they are usually combined with cutting plane methods (and called as branch and cut) [3].

Distributed Systems (GRIDS, P2P, Desktop GRIDS)

Solving computationally very complex problems requires parallel algorithms, run on several computers. Today mainly computer clusters are used for mass computation which consists of a few tens (or hundreds) of private high-performance computers. Cluster computers are mainly designed to work on single (or very few) problems in a parallel manner and thus balancing the load among the computers are the key challenge. GRID computers similar to cluster but geographically distributed, allowing much more high performance computers to be involved. GRID computers are also widely used providing mass computational power. They key disadvantage of GRID and cluster networks is the difficulty in providing a general tool for parallelizing algorithms, and maintaining a reliable trusted environment for parallel computing.

Another alternative is desktop GRID which tries to utilize the PCs idle cycles around the globe to provide powerful distributed system. Such projects (like Entropia network [6], SETI@home [7], Folding@Home [8], Parabon's compute-agains-cancer [9], and FightAIDS@Home [10]) are designed to solve special problems in an offline manner. These desktop GRID based on the unselfish Internet community donating their idle computational power for research purposes. Mainly humans are used to parallelize the algorithms for desktop GRID, unless they are not designed for a very specific type of calculation. Although, desktop GRID has achieved enormous computational power, currently the computational time of each job takes much more time than any business like computational application can tolerate. For example, Folding@Home has achieved more than 1000 teraflops at January 2008, which are $10^{15}$ floating point operations per second. Following the success of desktop GRID it must be assumed there is a distributed, heterogynous public environment; however the goal is a rapid problem solving in order to attract business applications, and allow a more powerful usage of world's idle computational power by establishing a market of computational time. In other words the goal is to provide consideration for the computers involved in the computation.

Meanwhile peer-to-peer (P2P) networks have achieved to connect extremely high number of computers. P2P applications are generally light weight and easy to install, their protocols can sneak through firewalls and network address translation (NAT). The main advantage of P2P networks over GRID networks is the simplicity of installation and maintenance. A P2P computer network runs at the application layer and all clients provide computing power. The current P2P networks are typically used for connecting nodes via largely ad hoc connections and mainly used for sharing content files or real-time data (i.e., audio or video streaming).

P2P networks basically have not been used for sharing computational power. Thus there is a need for a system whereby P2P networks are used for a desktop GRID-like network with prompt problem solving.

The present invention addresses this challenge, facilitated by an application called MIP that has market demand, and can be easily parallelized.

SUMMARY OF THE INVENTION

In one aspect of the present invention, a method for solving at least one computationally significant problem on a distributed basis by means of a network of associated and interconnected agent computers is provided, the method comprising the steps of: (a) defining a significant computationally significant problem for solving at one or more of the agent computers, such one or more agent computers being the first computer(s); (b) providing a distributed processing management utility at each of the plurality of associated agent computers for enabling distributed solution of the problem; (c) defining a plurality of sub-trees for the problem using a branch and bound algorithm; (d) assigning each sub-tree to one of the agent computers, each agent computer being operable to solve the sub-tree; (e) returning the result of each sub-tree solution to the first computer(s); and (f) aggregating the solutions on the first computer(s) to provide a solution to the problem.

In another aspect of the present invention, a system for solving at least one computationally significant problem on a distributed basis is provided, the system comprising a plurality of interconnected agent computers providing a distributed network of computers, each agent computer including or being linked to a distributed processing management utility for enabling distributed solution of the problem; at least one agent computer being operable to define a computationally significant problem for solving by the distributed network, such agent computer being the first computer(s); the distributed processing management utility being operable to: (a) define a plurality of sub-trees for the problem using a branch and bound algorithm; (b) assign each sub-tree to one of the agent computers, wherein each agent computer is operable to solve the sub-tree; (c) return the result of each sub-tree solution to the first computer(s) from the agent computers remote from the first computer(s); and (d) aggregate the solutions on the first computer(s) to provide a solution to the problem.

In a further aspect of the present invention, a computer program for enabling solution of at least one computationally significant problem on a distributed basis is provided, the computer program comprising computer instructions which made available to each of a plurality of interconnected agent computers provides on each of the agent computers a peer-to-peer utility, the agent computers thereby defining a distributed network of computers for solving the problem; wherein the peer-to-peer utility is operable to enable at one or more of the agent computers definition of a computationally significant problem for solving by the distributed network, such agent computers being the first computer(s); and wherein the peer-to-peer utility includes a distributed processing management utility operable to: (a) define a plurality of sub-trees for the problem using a branch and bound algorithm; (b) assign each sub-tree to one of the agent computers, wherein each agent computer is operable to solve the sub-tree; (c) return the result of each sub-tree solution to the first computer(s) from the agent computers remote from the first computer(s); and (d) aggregate the solutions on the first computer(s) to provide a solution to the problem.

BRIEF DESCRIPTION OF THE DRAWINGS

The invention will be better understood with reference to the drawings, which are provided by way of example and are not meant to narrow the scope of the invention.

DETAILED DESCRIPTION

Overview

The present invention describes system, methods, and computer programs for solving computationally significant problems, and in particular MIP, in distributed environments, where the number of computers (or users) involved in the optimization can be significant (for example a peer-to-peer network). Current peer-to-peer (P2P) networks may connect significant numbers of publicly addressable and/or publicly unaddressable computers, possibly having heterogeneous computational performance.

One aspect of the present invention describes methods that are designed to be robust in order to cope with all the difficulties in public and heterogeneous environments. The present invention overcomes the difficult task of load balancing a branch-and-bound tree in the described system. This is a very different task than for current parallel MIP solvers designed for GRID and cluster networks.

Another aspect of the present invention comprises a P2P utility that enables the processes described below. Thus the described system is operable to work in a distributed network.

Figure 1:
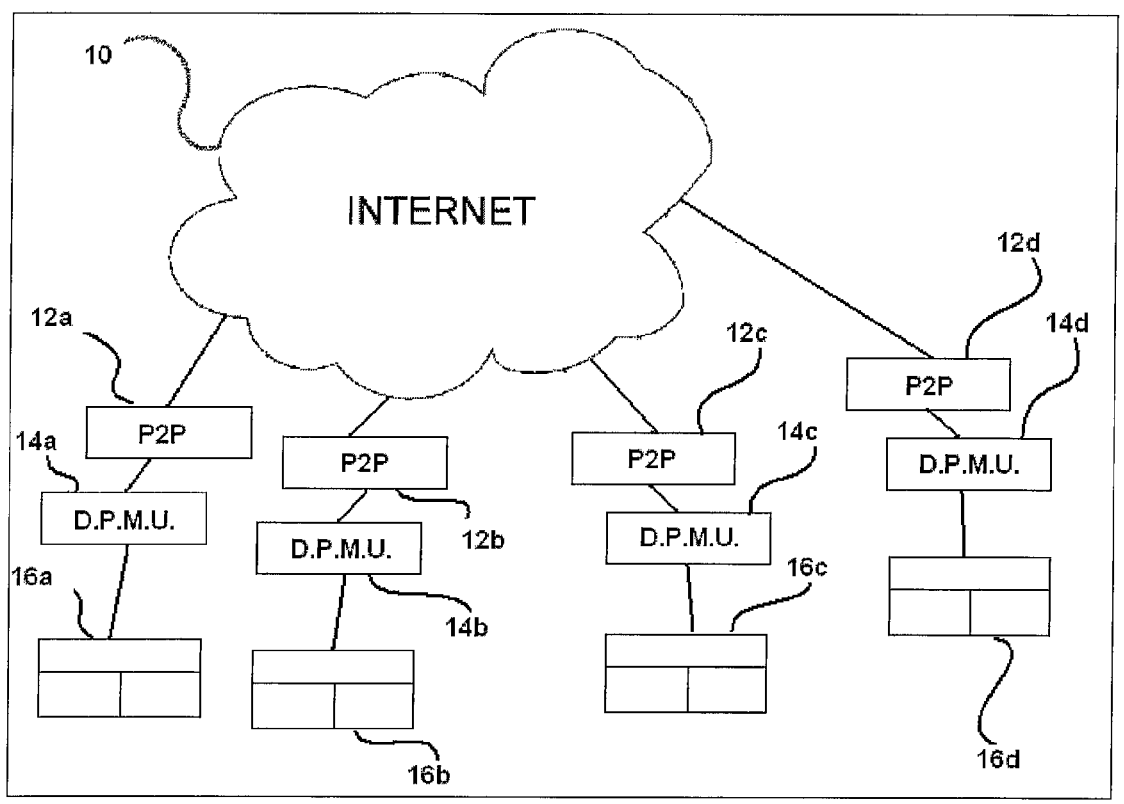
FIG. 1 illustrates generally the system described by the present invention.

FIG. 1 illustrates generally the system described by the present invention. Computers (16a, 16b, 16c, 16d) are associated to a P2P network, enabled by the Internet (10), through a P2P utility (12a, 12b, 12c, 12d). The P2P utility (12a, 12b, 12c, 12d) is provided by the present invention, and enables the processes described more fully below.

Figure 2:
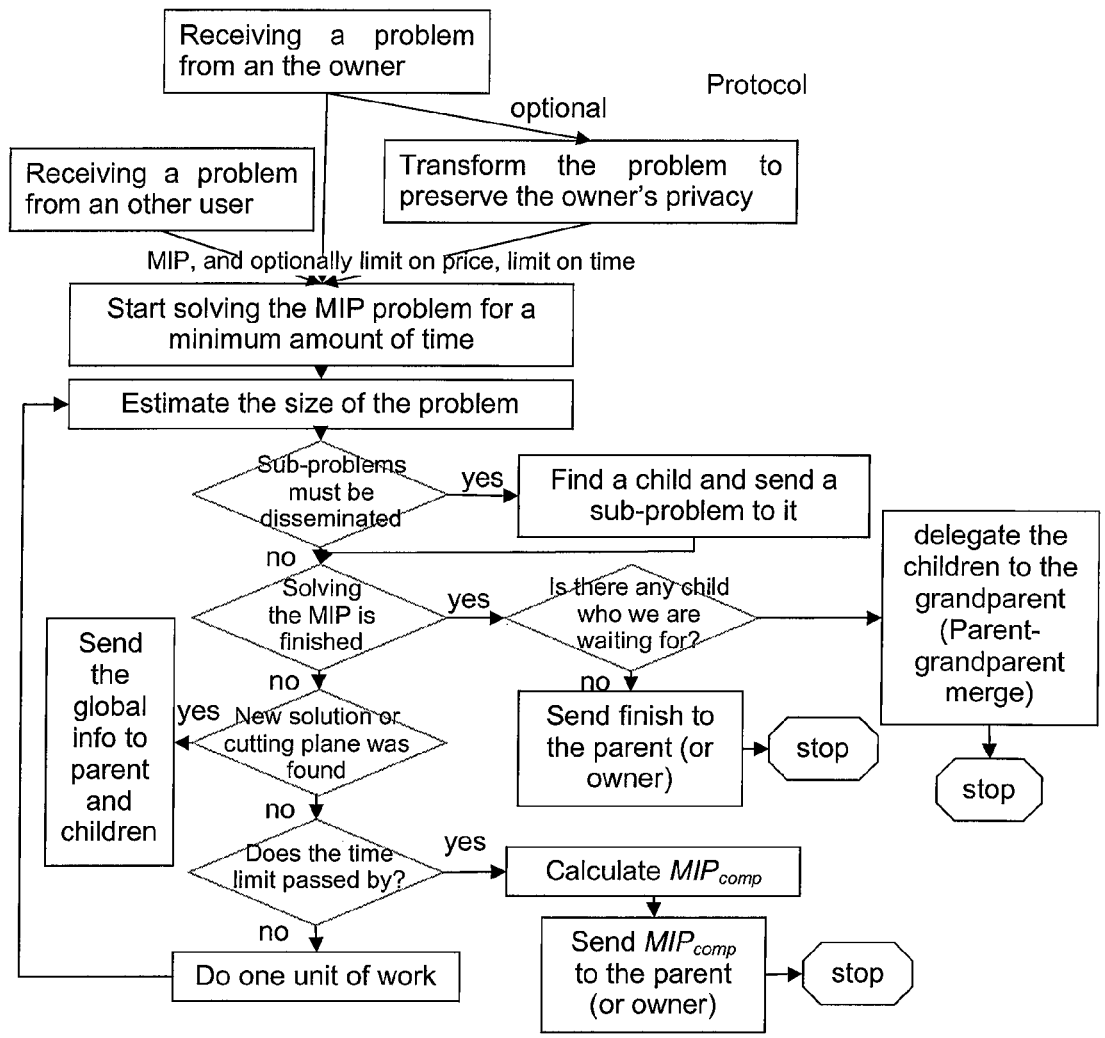
FIG. 2 illustrates a typical embodiment of the present invention as executed a representative computer within the distributed environment contemplated by the present invention.

Due to the very general and recursive structure of the processes enabled by the P2P utility, scalable problem solving can be achieved by building up a hierarchy among the computers involved. Scalable problem solving may be enabled by a distributed processing management utility (14a, 14b, 14c, 14d). The distributed processing management utility may be operable to optimize distribution of MIP among connected computers based on several factors and options described more fully below. FIG. 2 illustrates the dissemination of sub-problems, and is more fully described below. One aspect of the distributed processing management utility may be the progress agent described below.

To cope with a public environment techniques are proposed that enable verification and duplication of the work of any computer involved. Furthermore, within the system of the present invention, MIP framework calculation time limits can be assessed. Methods are described to support time limits in distributed problem solving, and the partially solved problems can even be further optimized any time afterwards. Several methods are described for load balancing in such a hierarchical network. A user, after installing the P2P utility, may sell its unused computation power to the others facilitating an enormous mass computer power for fast MIP solving.

A yet other aspect of the present invention addresses a concern in public networks such that techniques are described to hide the original problem from anonymous users involved in the optimization process, by scrambling the abstract sub-problem so that the logical structure and the human organization are erased. Thus secrecy and confidentiality are maintained. Compared to current parallel processing systems the calculation requests coming form other computers are industry standard MIP data files, allowing a high level of security and significant flexibility in applying solvers provided by any vendor.

A further aspect of the present invention describes the establishment of a market on computation power, which may have a significant effect on future internet technology. Many internet security and cryptographic methods are based on the difficulties in solving computationally complex problems. With the current invention the avoidance of spam e-mail messages and prevention of denial of service attacks can be easily facilitated.

Solving MIP in Distributed System

FIG. 2 illustrates the process whereby the MIP problem is disaggregated (distributed) and then reaggregated. MIP consists generally of breaking down a mixed integer problem into sub-problems recursively, thereby solving the problem in a relatively short time. The solutions to solved sub-problems may be aggregated recursively as well, such that the solution to the MIP problem is the aggregation of the solutions to the sub-problems. FIG. 2 illustrates a representative process from a node that is not a root node. Each of the following processes is described more fully below. Therefore, there is a parent node to the node shown in FIG. 2. A sub-problem may be received by the node, and optionally transformed for privacy purposes. Next, the node may begin to solve the problem, prior to requesting child nodes, for an amount of time set as a threshold. Once the threshold has been exceeded, the node may estimate whether child nodes will be required to solve the sub-problem. If so, the node may disseminate the sub-problem to child nodes as further sub-problems. Once each child node has completed its task, the solution may be returned to the node and then aggregated. Finally, once the node has received all solutions or a time limit has expired, the solution may be passed back to its parent. Implemented recursively, the root node may eventually receive a solution to the MIP.

In most MIP problems, the size of the branch-and-bound tree may be extremely large and requires significant computational resources to solve all its nodes. Parallelizing the branch-and-bound algorithm may be straightforward; however dividing up the work among the various processors in a balanced way may be an extremely difficult task due to the highly irregular shape of the search tree. The search tree may have an irregular shape due to bounding and fathoming, and its shape may change with new and tighter upper and lower bounds derived as the search progresses.

In a distributed system several branches of the search tree may be explored in parallel. By branching each active BB tree node, multiple active tree nodes may be generated. Each computer may solve the MIP problem with a limited size (e.g. a limit on the number of active BB tree nodes in the search tree) by continuously sending active BB tree nodes (or sub-trees) to other computers for processing (see also FIG. 3 as an example). In current parallel MIP solvers, a common concept to have central unit(s) for allocating sub-trees for the working computers may involve maintaining global information and controlling the solver processes.

The optimization process may require some global information to be disseminated to all the computers involved. The global information of the optimization may contain the best upper or lower bound found so far and the global cutting planes. It is assumed that the computers involved are geographically distributed and heterogeneous and thus do not have a common clock by which to synchronize their calculations. In other words, the communication among the computers may be asynchronous.

The main goal in parallelizing the MIP solver may be to achieve scalability and significant reduction in the parallel running time, which is the time to obtain the optimal solution. At the same time, it may be an important goal to have an efficient calculation, which means the sum of the running times of all computers involved should be close to the sequential running time, which is the running time of the best available sequential algorithm. The efficiency may be degraded due to [3]:

Communication overhead: Time spent sending and receiving information, including packing the information into the send buffer and unpacking it at the other end.

Performance of redundant work: Work that would not have been performed in the sequential algorithm.

As the runtime of solving MIP problems may be an exponential function of the problem size, one may not assume that each MIP problem launched in the system is optimally solved. For many real life problem this may not even be required, since some problems may not be even solved using all the world's computation power. The present invention discloses a novel framework which enables to verifying the performance of partially solved MIP or even to allow further optimize them if it is required afterwards.

Recursive Model to Maintain Scalability in Large Scale Networks

In order to capture the main strength of P2P networks an important design criterion may be to build up a system on sharing the computational power of each node, such that the overall computational power increases with each additional node joining the network. To achieve this a general and straightforward allocation of the BB sub-trees to the computers may be implemented. Each sub-tree may be formulated as an MIP problem, since the branching rules and the bounds can be added as constraints to the original MIP problem. In other words at every level of recursion the input of the problem may be an MIP problem with given bounds. This leads to a very general recursive model and may allow using different implementation of MIP solvers at each computer involved in the optimization process.

Figure 3:
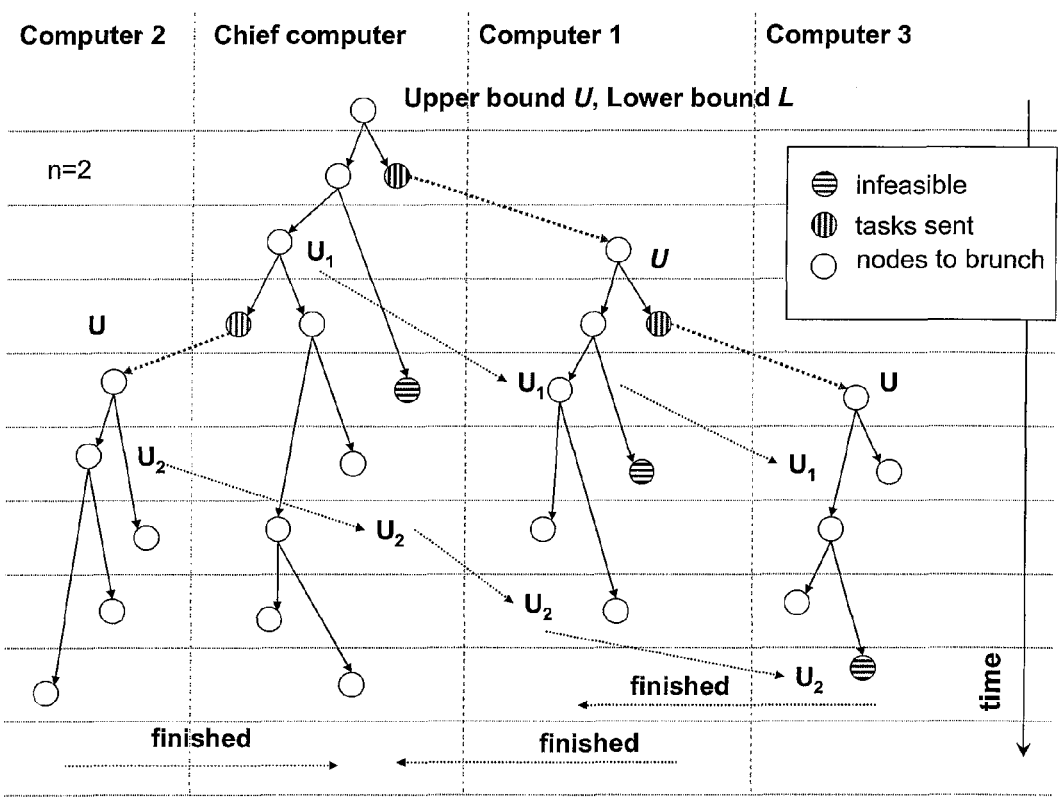
FIG. 3 illustrates an embodiment of the present invention wherein four computers are associated with one another via a peer to peer network and the computers are discovering a distributed search tree.
Figure 4:
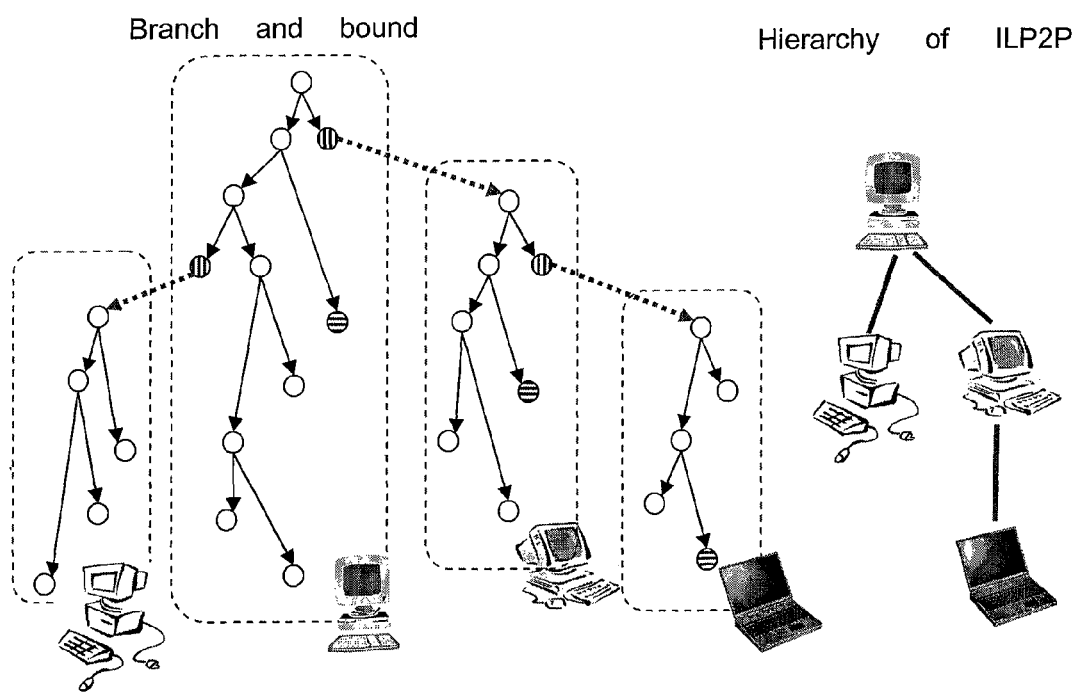
FIG. 4 illustrates a hierarchy of computers corresponding to the search tree previously illustrated in FIG. 2.

FIG. 3 illustrates four computers associated with one another via a peer to peer network wherein the computers are discovering a distributed search tree. FIG. 4 illustrates a hierarchy of computers corresponding to the search tree previously illustrated in FIG. 3. Each computer may solve the MIP problem with a limited size (e.g. limit on the number of active BB tree nodes in the search tree) by continuously sending active BB tree nodes (or sub-trees) to other computers for processing. The BB searching tree of the MIP problem is divided into sub-trees, forming a hierarchy in the computers engaged in solving the problem. The computers sending and receiving a sub-problem are called parents and children, respectively. Due to the recursive structure, scalability can be preserved because each computer communicates only to its parents (for fault tolerance it may have few backup parents as well), and to its limited number of children. Obviously the overhead generated by disseminating the global information strongly depends on the number of computers involved and their hierarchy.

Load Balancing with Progress Agent

Even if a BB tree has a very irregular shape in most cases, the load balancing problem can be mitigated by assigning more computers to the sub-trees which require further computation. Moreover, by facilitating a market of computational power, each user may try to sell its computational power and may advertise its availability and compete (or just wait) for the invitation of joining the optimization of one of the ILP problems being solved in the P2P network. On the other hand, the more computers are involved in the computation, the higher parallel overhead may result. Thus, the main tradeoff in achieving load balancing may be to find the best compromise in the number of computers involved and the efficiency of the calculation.

Figure 7:
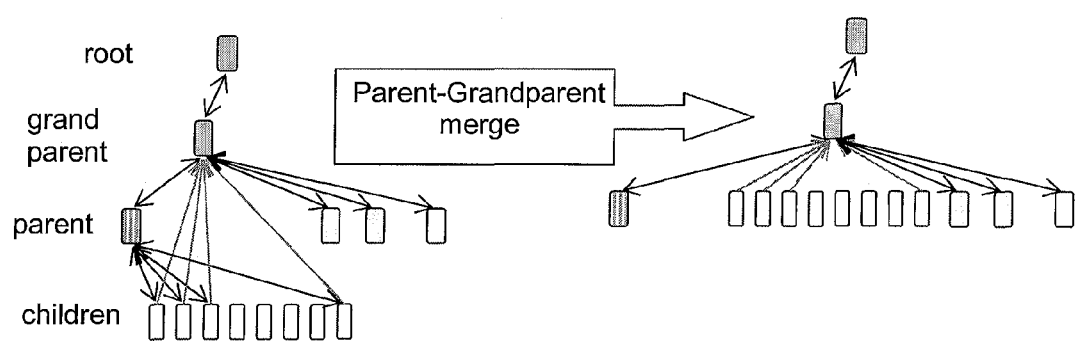
FIG. 7 illustrates a parent-grandparent merge operation.

FIG. 7 illustrates an additional load balancing task that keeps the depth of the hierarchy among the participants as small as possible. To achieve this, an approach is introduced wherein each participant may leave the calculation by delivering its children to its parent (the procedure is called parent-grandparent merging). This procedure may be activated when a parent has finished the calculation but its children are still working on their MIP sub-problems. In such a way the depth of the hierarchy can be reduced, and the participants can rejoin the calculation as a new child. The abovementioned issues may be implemented using a utility referred to herein as a Progress Agent (PA), which runs at each P2P node for monitoring and coordinating the distributed computing task.

It should be noted that although the present invention contemplates usage over a P2P network, there is no necessity to even distribution of rights. That is, computers connected on the P2P network may have different decision making ability, such that one (for example, the root node) may have the right to direct certain sub-branches to other nodes (for example, child nodes) while some computers (for example, child nodes) may not have the right to determine whether it is used or which branches it is to process.

Another important task of the Progress Agent is to speed up the finishing of solving the MIP problem by intelligently identifying the bottlenecks of computational speed, and possibly re-assigning some sub-problems to relatively fast computers that are part of the peer to peer network. At each level of hierarchy the PA may collect all the statistical data on the status of the calculation and aggregated status information may be sent back to the parents. In such a way the user that initiated the calculation can always keep track of the actual status of the problem (e.g. the number of computers are working on the problem, approximately what percent of the problem has been solved).

Novel MIP Solver

To cope with the public environment it is proposed to extend the MIP solver interface with possible options to verify (or duplicate) the work done by one or more of the computers involved. Verifying the solution of an optimally solved MIP problem can be done in a straightforward way by assigning the same problem to any other computers; however for a partially solved MIP it is rather complicated.

Moreover to facilitate a market of computational power, a new option may be added to the MIP solver interface so that not only the best results found so far are given back to the user, but also an MIP problem (being a sub-problem of the original MIP) that covers all of the unsolved BB sub-trees is returned. Formally, the solver may receive the input MIP problem (denoted by $MIP_{orig}$) and returns the best solution found so far along with a second MIP problem (denoted by $MIP_{comp}$), which is the MIP formulation covering all of the unsolved sub-problems. The above mechanism is based on the fact that subtracting a sub-problem from the $MIP_{orig}$ is fast and simple. In this way the user can always continue solving the problem if the obtained solution is not satisfactory, by solving $MIP_{comp}$.

Subtracting MIP Problems

Let us denote the root MIP problem by $MIP_{orig}$, while a sub problem branched from $MIP_{orig}$ during the branch and bound process denoted by $MIP_{branch}$. A technique may be to subtract two MIP problems (formally $MIP_{branch}$ is subtracted from $MIP_{orig}$ forming $MIP_{comp} = MIP_{orig} \setminus MIP_{branch}$), where the subtracted $MIP_{branch}$ problem is a sub-problem of the $MIP_{orig}$. For simplicity it may be assumed that only binary variables were branched and the branching was performed by tightening variable bounds, and no additional cutting planes were included in $MIP_{branch}$. In other words $MIP_{comp}$ and $MIP_{branch}$ have the same constraints; however some of binary variables of $MIP_{branch}$ are tighter compared to $MIP_{comp}$. These restrictions are not necessary, and theoretically any MIP problem can be subtracted from any other MIP problem (see Section A More General Way of Subtracting MIP Program), however such it is the most case in MIP solving with the current invention.

The subtracted MIP problem may be called a complementary problem, denoted by $MIP_{comp}$, and the two MIP problems, $MIP_{branch}$ and $MIP_{comp}$, cover the whole integer problem space of $MIP_{orig}$, however $MIP_{branch}$ and $MIP_{comp}$ are disjoint (they have no common feasible solution). In other words by solving $MIP_{branch}$ and $MIP_{comp}$ it may be guaranteed to get the optimal solution of $MIP_{orig}$.

The $MIP_{orig}$ can be formulated as:

$$MIP_{orig} \operatorname{Min} f(\underline{x})$$

$$g(\underline{x}) \geq 0$$

$$x_i \in [0,1] | \forall i \in B$$

where B be is the set of branched variables, which are binary according to our assumptions. Branching variable $x_i$ may be assigned the value of 1 or 0. Thus it can be formulated as adding $x_i = \beta_i$ constraints to the MIP formulation such, where $\beta_i$ is the branched variable bound of $x_i$. Let us denote the branched problem as follows:

$$MIP_{branch} \operatorname{Min} f(\underline{x})$$

$$g(\underline{x}) \geq 0$$

$$x_i = \beta_i | \forall i \in B$$

Figure 5:
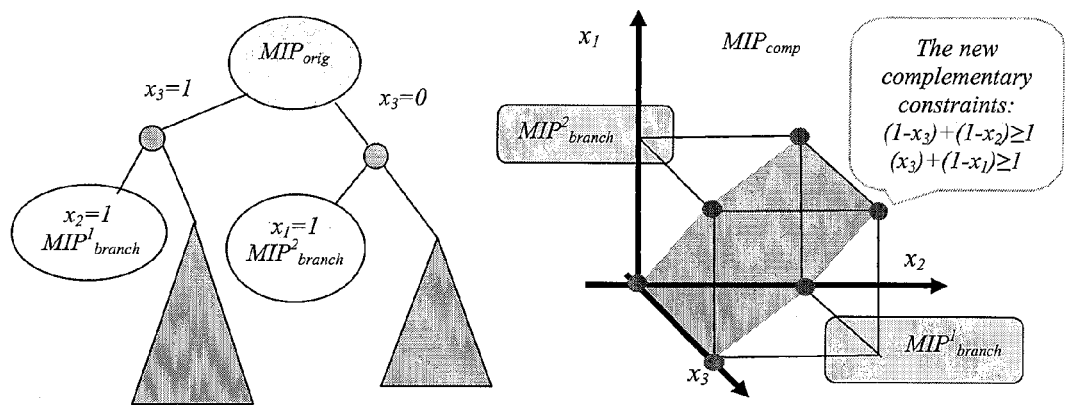
FIG. 5 illustrates the relationship between $MIP_{orig}$, $MIP_{branch}$, and $MIP_{comp}$.

FIG. 5 illustrates the relationship between $MIP_{orig}$, $MIP_{branch}$, and $MIP_{comp}$. The following problem covers the whole solution $$MIP_{comp} \operatorname{Min} f(\underline{x})$$

$$g(\underline{x}) \geq 0$$

$$1 \leq \sum_{\forall i \in B} \begin{cases} (1 - x_i) & \text{if } \beta_i = 1 \\ x_i & \text{if } \beta_i = 0 \end{cases}$$

$$x_i \in [0,1] | \forall i \in B$$

Proof 1 (below) shows that $MIP_{branch}$ and its complementary $MIP_{comp}$ may be disjoint and covers the whole problem space of $MIP_{orig}$. As a result $MIP_{comp}$ is merely the sub-problem of $MIP_{orig}$ where $x_i$ can take any values except $x_i = \beta_i$ for all $i \in B^n$.

Taking the constraint $$1 \leq \sum_{\forall i \in B} \begin{cases} (1 - x_i) & \text{if } \beta_i = 1 \\ x_i & \text{if } \beta_i = 0 \end{cases},$$

called complementary constraint, and adding it to the $MIP_{orig}$ yields the complementary $MIP_{comp}$ problem.

Proof 1: Each entry in the sum of $$\sum_{\forall i \in B} \begin{cases} (1 - x_i) & \text{if } \beta_i = 1 \\ x_i & \text{if } \beta_i = 0 \end{cases}$$

is greater non-negative, thus the sum equals to 0 only if $x_i = \beta_i$ for all $i \in B^n$ and otherwise the sum is greater than 0. In other words $MIP_{branch}$ can be formulated as $$MIP_{branch} \operatorname{Min} f(\underline{x})$$

$$g(\underline{x}) \geq 0$$

-continued $$0 = \sum_{\forall i \in B} \begin{cases} (1 - x_i) & \text{if } \beta_i = 1 \\ x_i & \text{if } \beta_i = 0 \end{cases}$$

$$x_i \in [0,1] | \forall i \in B$$

Since $x_i \in [0,1]$ are binary variables, the sum can take only an integer value. One can easily see that $MIP_{branch}$ and $MIP_{comp}$ cover a disjoint problem space however their union covers $MIP_{orig}$.

Subtracting Multiple Branches from an MIP Problem

Multiple branches can be subtracted from the original problem by adding multiple complementary constraints to the $MIP_{orig}$. Formally, the proposed method can be extended so that there is given an $MIP_{orig}$ and several $MIP^1_{branch}$, $MIP^2_{branch}$, ... and $MIP^n_{branch}$ sub-problems:

$$MIP_{branch}^1 \operatorname{Min} f(\underline{x})$$

$$g(\underline{x}) \geq 0$$

$$x_i = \beta_i | \forall i \in B^1$$

$$MIP_{branch}^2 \operatorname{Min} f(\underline{x})$$

$$g(\underline{e}) \geq 0$$

$$x_i = \beta_i | \forall i \in B^2$$

...

$$MIP_{branch}^n \operatorname{Min} f(\underline{x})$$

$$g(\underline{x}) \geq 0$$

$$x_i = \beta_i | \forall i \in B^n$$

and a single $MIP_{comp}$ can be formulated such that:

$$MIP_{comp} \operatorname{Min} f(\underline{x})$$

$$g(\underline{x}) \geq 0$$

$$1 \leq \sum_{\forall i \in B^1} \begin{cases} (1 - x_i) & \text{if } \beta_i = 1 \\ x_i & \text{if } \beta_i = 0 \end{cases}$$

$$1 \leq \sum_{\forall i \in B^2} \begin{cases} (1 - x_i) & \text{if } \beta_i = 1 \\ x_i & \text{if } \beta_i = 0 \end{cases}$$

$$\vdots$$

$$1 \leq \sum_{\forall i \in B^n} \begin{cases} (1 - x_i) & \text{if } \beta_i = 1 \\ x_i & \text{if } \beta_i = 0 \end{cases}$$

$$x_i \in [0,1] | \forall i \in B^1 \cup B^2 \cup ... \cup B^n$$

so that by solving all of these problems the optimal solution can be derived. Proof 2 shows that the corresponding sub-problems are disjoint and cover the whole problem space of $MIP_{orig}$. As a result, subtracting a sub-problem from $MIP_{orig}$ may merely require adding a single constraint to it.

Proof 2: As a consequence of Proof 1, the problem $MIP_{comp}$ consists only of the sub-problem of $MIP_{orig}$ where $x_i$ can take any values except $x_i = \beta_i$ for all $i \in B^1$ and except $x_i = \beta_i$ for all $i \in B^n$, and ... $x_i = \beta_i$ for all $i \in B^n$. Thus $MIP_{branch}$ and $MIP_{comp}$ cover a disjoint problem space however their union covers $MIP_{orig}$.

It may further be suggested to transform the entire integer variable into a series of binary variables at the root node as described below (see Basic Level of Privacy Preservation), which also facilitates a higher level of privacy preservation. In such a way subtracting each $MIP_{branch}$ may merely require adding a single constraint to the problem. However the proposed technique can be generalized to deal with new cutting planes or branching integer variables as well.

A More General Way of Subtracting MIP Program

In the present invention, when a new constraint to the $MIP_{orig}$ is added to form $MIP_{branch}$, the complementary constraint may also need to be defined.

Let h(x) denote the new constraints. Since it is a cutting plane or branch it is defined on some integer variables. It may be required to define a complementary constraint $h'(x) \geq 0$, such that for any instance of integer variables either $h_i(x) \geq 0$ holds or $h_i(x) \geq 0$ holds (but both are never holding). The present invention does not provide any general method for defining the complementary condition for every type of branching rule and cutting plane, but by introducing new binary variables it can always be facilitated.

Time Limit on Distributed MIP Solving

An MIP user may wish to request a time limit for getting back a solution. The present invention may use the time limit for load balancing purposes as well. In the proposed framework, the input of the problem may consist of an MIP (denoted by $MIP_{orig}$) problem along with a time limit to obtain the solution. The solver may return the best solution found so far within the time limit, and a second MIP problem (denoted by $MIP_{rest}$), which is the union of the unsolved sub-problems. When a computer receives a problem it may estimate the computational expense of the problem, and decide how many and which active nodes should be sent out so that the rest of the sub-tree may be solved before the end of the time limit. In such a way the problem may spread along the network, and by the end of the time limit the last children may send back either the results or generate an MIP sub-problem that they have not been able to solve. Their parents may collect these MIP and merge them together with their unsolved sub-problems into a single MIP problem which may be sent back to their parents, and so on. Finally the root node may receive the $MIP_{comp}$ problems that were not solved within the time limit. If the user is not satisfied with the quality of the obtained solution, it has the $MIP_{res}$ problem, and can solve it later at any time to get a better solution on the original problem.

To implement the above mechanism each user when solving an MIP problem may realize that the time limit is approaching and may collects all of the unsolved branches. Next, according to the method described above (see Subtracting MIP Problems) $MIP_{comp}$ may be calculated and sent back to its parent.

There can be unsolved branches because of two reasons:

An $MIP_{branch}$ was received from its children. In this case, the user may first be required to identify the complementary constraint added to the problem.

The user may have underestimated the size of MIP problem it received, or overestimated its computational power and was not able to finish solving the BB sub-tree it was working on. In this case each totally solved sub-trees may be treated as $MIP_{branch}$ and may be subtracted from the problem. In the second case if the BB tree was solved in a very random way and there are a great number of totally solved sub-trees the size of $MIP_{comp}$ can be significantly increased.

Figure 6:
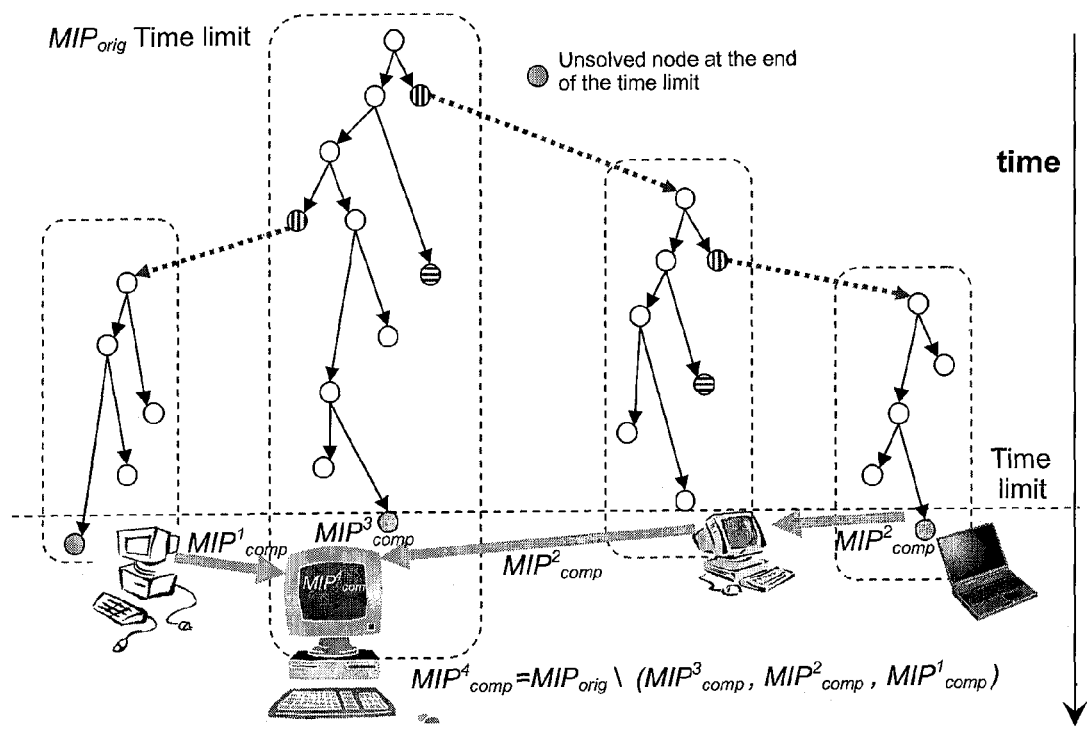
FIG. 6 illustrates the hierarchical merging of unsolved sub-problems.

FIG. 6 illustrates the hierarchical merging of unsolved sub-problems. As soon as the unsolved sub-problems are identified, the corresponding complementary constraints may be added to $MIP_{orig}$ forming $MIP_{comp}$, which may be sent back to its parent. As a result this method is repeated recursively and the root node of the hierarchy may receive the aggregated $MIP_{comp}$. Each subtracted sub-problem is manifested as an additional constraint (or possible a binary variable), thus the size of the $MIP_{comp}$ may be bigger than $MIP_{orig}$. A precise approximation on solution time of the MIP problem can help keeping the $MIP_{comp}$ small.

Branch and Bound Techniques to Maintain Scalability

As mentioned earlier, FIG. 2 illustrates the dissemination of sub-problems. Each active node in the BB tree can be either sent out for processing, or it can be processed by itself. In coping with each tree node, two new children nodes may be generated corresponding to the branch-and-bound algorithm. Compressing and sending a tree node may take much more time then processing it. In this case special branching techniques may need to be applied to avoid overrun with active BB nodes. A computer overloaded with too many active BB nodes might become a bottleneck in the calculation. A possible solution on this problem is to merge several active nodes into a single MIP problem before sending them to a new computer. In such a way the computer can easily reduce the number of active nodes to a level that it can handle effectively. Merging active nodes of the same branch can be done using the technique of Section Subtracting MIP Problems.

Another technique is to use node selection methods like depth search in discovering the BB tree, until one (or several) BB nodes are fathomed. Using statistical information of BB the size of the tree can be estimated. This approximation can be done in a straightforward way using the average depth of the BB tree, or matching curves on the decrease in gap or on the ratio of fathomed nodes. With the approximate size of the BB tree the computer can estimate the computational resource need of solving the MIP problem, and can decide to have children or not. It is suggested to pick the closer active BB nodes to root for sending to children.

Each user may estimate the size of the sub-problem it can handle and may send the rest of the problem to other users for processing. An underestimation on the problem size may lead to a parallel inefficiency since the user must wait until its children finish their job.

This inefficiency can be reduced if the user can delegate its children to any other user. Such a mechanism is described below in the section Parent Grandparent Duplication and Merge. On the other hand overestimation on the problem size may lead to an enormous size of $MIP_{comp}$, which may be even more disadvantageous and may be considered a negative when the price of the job is estimated.

Parallel Efficiency

The computation time for solving each node in a BB tree is usually a few times less than that taken for compressing and sending those BB tree nodes to the other computers. Thus it is a goal to have an optimal number of children (i.e. no more than required). Generally the key task in the effort of ensuring parallel efficiency is to identify which BB tree nodes are good candidates to be sent (as solving the corresponding MIP sub-problem would take much more time then sending it out), and which BB tree nodes will be handled by itself.

Two methods of solving this problem include:

Use of a gap threshold, whereby if the gap between the best found integer solution and the relaxed cost of the active node is less than a predefined threshold, the children of the active nodes may not be sent out.

Imposition of a minimum time limit that a computer must spend on solving the problem before it can invite children to join the calculation.

Reliability

Due to the significant number of computers involved, reliability may be an important issue, which generally gains less attention in trusted and reliable GRID networks, or in desktop GRID networks, where prompt response is less critical. The unreliability can be due to computer or application shut downs, or simply that the correctness of the calculation can not be guaranteed.

The robustness of the calculation may be increased by partly replicating the calculation over multiple computers even for computers without children. The parents may be duplicated as otherwise the computation of the children is also lost if the parent is turned off. The parent may be duplicated by the grandparent, which also helps a parent to merge into its grandparent, when the parent has finished all of its computation (see next section for details). Since there may be a huge number of nodes in the network, the redundancy is expected not to become a critical problem in terms of parallel runtime to the applicability of the proposed approach.

Parent Grandparent Duplication and Merge

The user (parent) that has sent out jobs to other computers (children) may be required to be duplicated, since if the parent is turned off, the child will not be able to send back its result.

This problem may be solved by duplicating each parent by its parent (called the grandparent). It may be advantageous for load balancing reasons since when the parent has finished solving its MIP sub-problem it may simply leave the calculation, and its children may be adopted by the grandparent. In such a way the depth of the hierarchy among the computers involved can be kept low.

FIG. 7 illustrates how this method may be implemented. When a problem is sent to a child the ID of the grandparent may also be included in the message. After a minimum amount of calculation time, the child may send an introductory message to the grandparent. If the grandparent can accept the child, the child may send its MIP problem instance. In such a way the grandparent can verify the work done by the parent (its children).

Privacy Preservation of the Problem Data

When a user has an optimization problem, it first may need to be formulated as an MIP problem. Generally users do not want to disclose the problem they want to solve in an open environment. Traditional cryptographic methods are suggested to apply in transferring the problem on a secure channel, and thus only the children can get knowledge on the problem worked on. However much more powerful methods may be required so that the child is not able to understand the original optimization problem it is solving. For example where a bus company wants to start a new route, a new bus schedule optimization may be launched in the network to calculate the price of starting the new bus line. The route of the new bus line is a trade secret, and it is very important for the bus company that even if the new topology is formulated in the MIP problem, the computers solving it are not able to reconstruct the new topology. It is still an open problem in cryptography to hide the problem from the computers who are actually solving it. Clearly, the fact that there is a graph behind the problem may significantly help the solving of the problem especially if an effective graph algorithm can be applied, as a result no doubt hiding the problem may stiffen the job of solvers, and thus the later proposed methods must be applied with a great care, and often a higher level of privacy preservation leads decrease in efficiency. It should be noted that the term "privacy" used here extends to any data for which it may be desired to keep secret or confidential. This data may correspond to personal data, trade secret data, or any other data. For clarity, "privacy" in this disclosure does not refer solely to "personally information".

Figure 8:
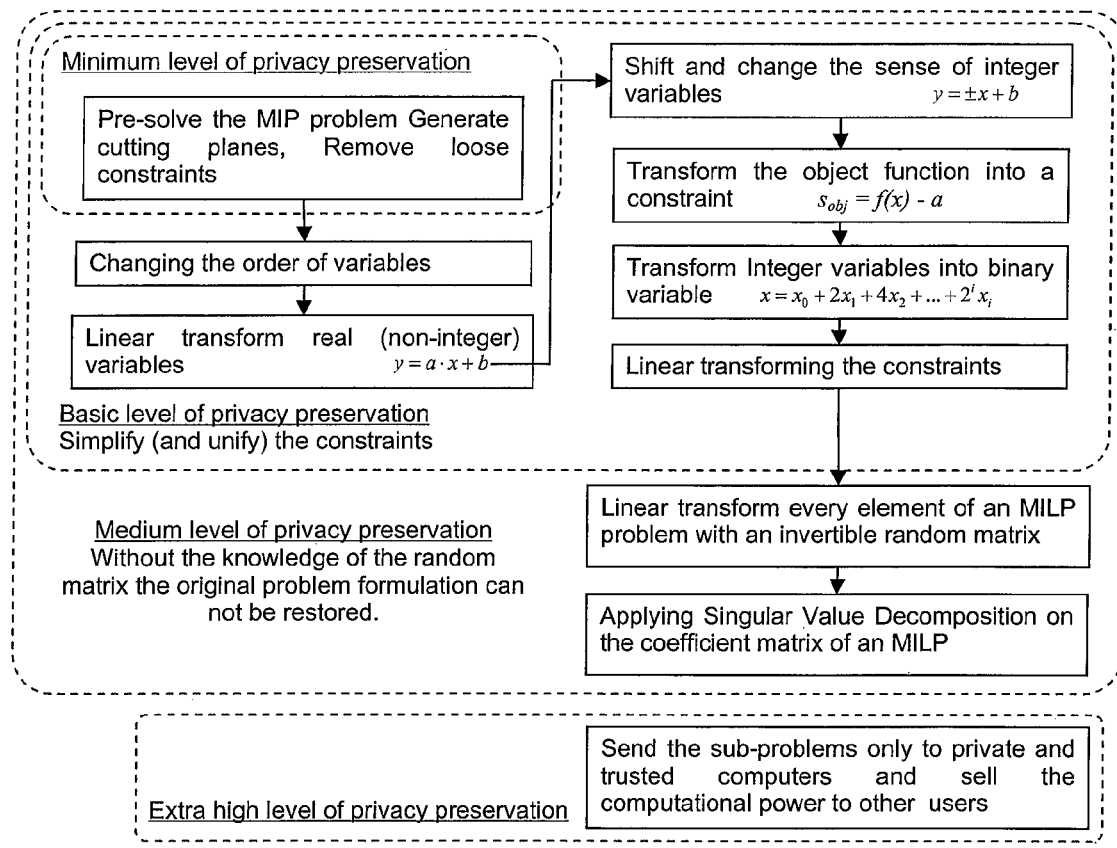
FIG. 8 illustrates the method of preservation of privacy of the present invention.

FIG. 8 illustrates privacy preservation using the Minimum, Basic, Medium, and Extra High levels. Each level is described below. The corresponding privacy preservation techniques may modify the MIP formulation to hide the sensible part of the problem. It is suggested to perform such transformation only at the root node, otherwise verifying the users and subtracting MIP brunches without the knowledge of the transformation would become a complicated task.

Minimum Level of Privacy Preservation

A minimum level of privacy preservation is when the maximum level of privacy preservation is requested without sacrificing parallel efficiency. It may include first pre-solving the problem, which can significantly reduce the size of the coefficient matrix, than resealing the coefficient matrix to reduce numerical instability and finally calculating additional cutting planes.

Basic Level of Privacy Preservation

A basic level of privacy preservation is when the structure of the original optimization problem is required to remain hidden. In many cases it may not be the problem itself that carries important information which should remain hidden, but its structure, its logical organization, or more generally the human idea behind the problem. The logical organization of the MIP problems may be manifested as replication of patterns or blocks of coefficient matrices. By re-arranging the variables and constraints, and transforming the original MIP problem into a uniform form most of the logical organization can be eliminated, the solution of the transformed problem can be still distorted back to the solution of the original problem.

By pre-solving the problem the repeated and trivial constraints may be eliminated. The real (non-integer) variables can be transformed such that variable x can be replaced by $y=a \cdot x+b$, where a and b are random values, and the lower and upper bounds of y should be set $a \cdot x^{lb}+b$ and $a \cdot x^{ub}+b$, respectively. Note that for integer variables, a can be either 1 or −1, and b must be an integer value. It may be best to keep every variable of the original MIP problem as non-negative. The use of these techniques may allow the number of variables in the representation of the constraints (for MILP it is the nonzero elements in coefficients matrix) to be decreased, and in such a way transferring the problem through the network may take less time. Finally additional cutting planes may be calculated and added to the MIP and the constraints that are too loose to restrict the feasibility regions may be removed.

The object function and the variable bounds may be transformed into uniform format to prevent the users to guess what the original optimization problem was based on the solution. Let $f(x)$ be the object function, where x is the decision variables of the problem. By introducing a new variable $s_{obj}$ and including a new constraint that $s_{obj}=f(x)-a$ and the new object function to minimize would be $s_{obj}$. It is generally assumed that every variable of the MIP problem is non-negative. Thus constant a may be added as a constraint to ensure variable $s_{obj}$ to be non-negative. The constant a may be set to the same value as the cost of the relaxed solution. This technique may not be feasible with every type of MIP; for example in quadratic programming the cost function can be a quadratic function, however the constraints must be linear.

Next all integer but not binary variables can be replaced by several binary variables with the following method. Let x be an integer variable that may be substituted by $$x=x_0+2x_1+4x_2+\ldots+2^i x_i$$

where $x_i$ are binary variables and parameter i is chosen so that $x^{up}-x^{lb} \leq 2^i$, where $x^{up}$ and $x^{lb}$ represent the upper and lower bound of variable x, respectively. In this case two new constraints may be added:

$$x^{lb} \leq x_0 + 2x_1 + 4x_2 + \ldots + 2^i x_i$$

$$x_0 + 2x_1 + 4x_2 + \ldots + 2^i x_i \leq x^{ub}$$

unless they are trivial. This substitution generally should be done in every constraint where x was involved.

For real variables the $y=a \cdot x+b$ transformation can be applied so that y would have 0 as lower and 1 (or infinity if the x variable had no upper bound unbounded) as upper bound.

Linear transformations may be performed on the constraints. Any constraint may be multiplied with a constant. Moreover the equality constraints (constraint of "=") may be added to each other.

It may be significant that the transformation matrix be invertible. For MILP this may be by multiplying the coefficient matrix with another (transformation) matrix from the left. To accomplish this level of privacy preservation, this technique may be used for decreasing the number of nonzero elements in coefficients matrix.

Finally, the order of variables and constraints may be changed. With the above technique there may be provided a scrambled series of binary variables in the problem (along with some real variables), a cost function consisting of a single entry, and a scrambled and modified coefficient matrix with fewer nonzero elements. Such processing may hide most of the human ideas and private input data behind the MIP problem structure.

Medium Level of Privacy Preservation

A medium level of privacy preservation is when all of the coefficients of MIP and the structure of the original optimization problem are kept hidden. In this case the MIP's input data and also its logical organization may be hidden. The user can transform every element of the MIP problem with a random transformation; however the solution of the transformed problem can be distorted back to the solution of the original problem. Without the knowledge of the random matrix the original problem formulation can not be restored.

The present technique works for MILP. The MILP problem may be formulated as $$\text{Min} \, \underline{c}^T \underline{x}$$

$$\underline{A} \cdot \underline{x} \geq \underline{b}$$

where x represents the vector of variables and some of them can take only integer values, while c and b are vectors of coefficients and A is a matrix of coefficients with some integer variables. Matrix A has m rows and n columns. Vector b is also called right hand side, while $\underline{c}^T \underline{x}$ is called object function.

In order to transform every coefficient of matrix A first, all of the inequalities may be transformed to equations by introducing slack variables. If the constraints of the linear program are:

$$\sum_{i=1}^{n} a_{j,i} \cdot x_j \geq b_j \quad \forall j$$

then it can be written as $$\sum_{i=1}^{n} a_{j,i} \cdot x_j + s_j = b_j \quad s_j \geq 0 \quad \forall j$$

where $s_j$ is the non-negative slack variable. It is called the augmented form of the linear program.

Next, the object function $\underline{c}^T \cdot \underline{x}$ may be added as a constraint to the MIP problem by introducing an additional slack variable $s_{obj}$ as it was described under basic level of privacy preservation. Thus the following problem may be presented:

$$\text{Min} \, s_{obj}$$

$$s_{obj} - \sum_{i=1}^{n} c_i \cdot x_i = 0$$

$$\sum_{i=1}^{n} a_{j,i} \cdot x_j + s_j = b_j \quad s_j \geq 0 \quad \forall j$$

In matrix form the MIP can be written as $$\text{Min} \, s_{obj}$$

$$\begin{bmatrix} 1 & -\underline{c}^T \\ & \underline{A} & \underline{E'} \end{bmatrix} \cdot [s_{obj} \, \underline{x} \, \underline{s}] = [0 \, \underline{b}]$$

where E' is an identity matrix with some erased columns. Note that the slack variable may be assigned only to these rows, which corresponds to constraints with inequality sign. Vector s corresponds to the slack variables. In such a way the problem may have l variables.

Next a random non-singular (m+1)-by-(m+1) quadratic matrix R may be generated. Since it is non-singular it may have an inverse matrix $R^{-1}$, so that $R \cdot R^{-1} = E$, where E is the identity matrix. This matrix may be the cryptographic key of the problem. Without the knowledge of this matrix it is very hard to figure out the original MILP problem. Instead of the original problem $$\underline{A}' = \underline{R} \cdot \begin{bmatrix} 1 & -\underline{c}^T \\ & \underline{A} & \underline{E'} \end{bmatrix}$$

may be sent as a coefficient matrix, and instead of right hand side $\underline{b}' = \underline{R} \cdot [0 \, \underline{b}]$ may be sent, so that the problem becomes:

$$\text{Min} \, s_{obj}$$

$$\underline{A}' \cdot [s_{obj} \, \underline{x} \underline{s}] = \underline{b}'$$

Or with equations:

$$\text{Min} \, s_{obj} - \sum_{i=1}^{n} \left( r_{j,1} \cdot c_j + \sum_{k=1}^{m} r_{j,k+1} \cdot a_{k,i} \right) \cdot x_i + r_{j,j+1} \cdot s_j + r_{j,1} \cdot s_{obj} = \sum_{k=2}^{m+1} r_{j,k} \cdot b_j \quad \forall j$$

In such a way the problem may be transformed such that none of the original coefficients can be figured out. Note that several slack variables are introduced to keep the sign of the inequalities, which increase the size of the problem.

Matrices $\underline{R}$ and $\underline{R}^{-1}$ can be generated by simply applying the elementary row (or column) operations a great number of times randomly on matrix $\underline{E}$ symmetrically. There are three types of elementary row operations:
1. Row switching, when a row within the matrix is switched with another row.
2. Row multiplication, when each element in a row is multiplied by a non-zero constant.
3. Row addition, when a row is replaced by the sum of that row and a multiple of another row.

An optimal solution of the transformed problem may be the same as the solution of the original problem. The techniques described in basic level of privacy preservation may also be applied, so that the solution may correspond to a scrambled series of binary variables (along with some real variables).

In order to improve the efficiency techniques of described in the section Improving the Performance of Solving Transformed MIP Problems can be further applied. However the intelligent MIP solvers can also take advantage of a good logical organization found in the problem and, as efficiency matters, the proposed techniques may be used moderately (only as much as the user requires). Furthermore, due to nature of the branch-and-bound algorithm, the original problem may always be solved by the root computer and thus all the other computers may solve only a branch in the search tree, which may just be a subset of the original problem space (e.g. the MIP problem is extended with some additional constrains).

Improving the Performance of Solving a Transformed MIP Problem

Due to the great number of slack variables the size of the MIP problem may increase. In addition if the original coefficient matrix $\underline{A}$ was a sparse matrix it may be desired to keep it sparse after multiplying with the random quadratic matrix.

If there are real variables in the MIP it may be desirable to apply the followings further transformation. Let $x^i$ be the integer and $x^r$ be real variables of the MIP problem. The variables may be rearranged so that $x=\lfloor x^i \ x^r \rfloor$ and introduce slack variables, so finally the MIP problem can be formulated as $$\text{Min } s_{obj} + [\underline{c}^r]^T \cdot \underline{x}^r$$

$$\begin{bmatrix} 1 & -[\underline{c}^i]^T & & \\ & \underline{A}^i & \underline{A}^r & \underline{E}' \end{bmatrix} \cdot [s_{obj} \ \underline{x}^i \ \underline{x}^r \ \underline{s}] = [0 \ \underline{b}]$$

The constraints can be reformulated as $$\text{Min } s_{obj} + [\underline{c}^r]^T \cdot \underline{x}^r$$

$$\begin{bmatrix} -[\underline{c}^i]^T \\ \underline{A}^i \end{bmatrix} \cdot \underline{x}^i + \begin{bmatrix} 1 & & \\ & \underline{A}^r & \underline{E}' \end{bmatrix} \cdot [s_{obj} \ \underline{x}^r \ \underline{s}] = [0 \ \underline{b}]$$

The problem may be randomly transformed by multiplying from the left by matrix $\underline{R}$ to get the following problem:

$$\text{Min } s_{obj} + [\underline{c}^r]^T \cdot \underline{x}^r$$

-continued $$\underline{R} \cdot \begin{bmatrix} -[\underline{c}^i]^T \\ \underline{A}^i \end{bmatrix} \cdot \underline{x}^i + \underline{R} \cdot \begin{bmatrix} 1 & & \\ & \underline{A}^r & \underline{E}' \end{bmatrix} \cdot [s_{obj} \ \underline{x}^r \ \underline{s}] = \underline{R} \cdot [0 \ \underline{b}]$$

Applying the Singular Value Decomposition (SVD) [12] on $$\underline{R} \cdot \begin{bmatrix} 1 & & \\ & \underline{A}^r & \underline{E}' \end{bmatrix} = \underline{U}^r \cdot \underline{E} \cdot \underline{V}^r \text{ to}$$

may obtain matrix $\underline{U}^r$ and $\underline{V}^r$. The MIP problem can be formulated as:

$$\text{Min}[1 \ [\underline{c}^r]^T \ 0] \cdot [s_{obj} \ \underline{x}^r \ \underline{s}]$$

$$\underline{R} \cdot \begin{bmatrix} -[\underline{c}^i]^T \\ \underline{A}^i \end{bmatrix} \cdot \underline{x}^i + \underline{U}^r \cdot \underline{E} \cdot \underline{V}^r \cdot [s_{obj} \ \underline{x}^r \ \underline{s}] = \underline{R} \cdot [0 \ \underline{b}]$$

Multiplying the constraints with $\lfloor \underline{U}^r \rfloor^{-1}$ from the left, and introducing a vector of new variables $\overline{\underline{y}}^r = \underline{V}^r \cdot \lfloor s_{obj} \ \underline{x}^r \ \underline{s} \rfloor$ results in, $\underline{x}^r$ as $[s_{obj} \ \underline{x} \ \underline{s}] = [\underline{V}^r]^{-1} \cdot \underline{y}^r$.

The problem can be written as $$\text{Min}[1 \ [\underline{c}^r]^T \ 0] \cdot [\underline{V}^r]^{-1} \cdot \underline{y}^r$$

$$[\underline{U}^r]^{-1} \cdot \underline{R} \cdot \begin{bmatrix} -[\underline{c}^i]^T \\ \underline{A}^i \end{bmatrix} \cdot \underline{x}^i + \underline{E} \cdot \underline{y}^r = [\underline{U}^r]^{-1} \cdot \underline{R} \cdot [0 \ \underline{b}]$$

In such a way the coefficient matrix may have fewer non-zeros.

Extra High Level of Privacy Preservation

Extra high level of privacy preservation can be achieved by sending the sub-problems only to private and trusted computers. Obviously the current invention can be used in such private environment for distributed computing. Most companies have optimization problems very rarely, possibly a few times a year. For them buying a computer cluster might be rather expensive, however with the current invention, they are able to sell the computational power in the rest of the year, reducing its expense.

Implementation an Electronic Market on Computational Power

Solving any mathematical program may require enormous computational resources; thus a mechanism is suggested by the present invention to be implemented to guarantee a fair resource usage among network users.

An electronic market (e-market) may be defined such that the computation resources may be delivered through a transaction between two P2P users by way of electronic tokens (e-tokens). In such an environment, a P2P user can acquire e-tokens either from another user or from a Trusted Third Party (TTP). In the former case, the user may be required to grant the computation resource of his/her computer to the other user; while in the latter, the user may be required to purchase the e-tokens from the TTP. Once the user obtains e-tokens, the user can either use them to request for computation resources from others for his/her own optimization problems, or cash/refund the e-tokens at the TTP.

The relation between the users of the current invention can be classified into two main categories: they can be friends or business partners.

Friends may be defined as those that absolutely trust each other and do not accept any payment for the tasks. Computers belonging to the same company may be regarded as a group of friends, and thus no accounting and solution verification may be required among them. In this case efficiency may be the main goal in solving the mathematical program. Obviously a group of friends can have a common cache register and they can be treated as a single business entity for the rest of the users. Using P2P in this case instead of a local. GRID is advantageous due to its robustness against the failure of any P2P node since the P2P processing node can be easily turned down during the calculation.

On the other hand, solving an MIP problem (or branch) for a business partner may be done using electronic tokens, and thus significant efforts may be expended to prevent any fraud attempt at the expense of efficiency. In other words, an anonymous user can not be trusted to send back the optimal solution of the MIP branch it received. In the next section methods are presented to guarantee the optimality. The methods are based on redundancy in solving the MIP, which can be done sending the same problem instance to other users for verification. Besides the inaccuracy of the results the correctness of billing may also be filtered at the same time.

Verification the Results

A random verification may be used to verify the results, in which the same problem instance is sent to another user with a predefined probability, and the returned results are compared. According to the past history of the user a creditability metric may be defined, which may be used to determine the probability of verifying its results. For verification after the user has finished the calculation the same problem instance may be sent to any other user (see next section for details), and the results may be compared. Two types of improper behavior may be checked, 1. not doing a proper calculation
2. reporting a longer (or shorter) calculation time (which may only be desired when billing is activated)

In the first case the user can be punished by reducing its creditability value, or even ruled off the network for a while. In the second case the user's efficiency factor (the factor describing its performance in MIP solving) may be reduced to the new value.

Verification of a Child

Verifying a user, who does not have any children, is straightforward by sending exactly the same messages with the same timing to the user selected for verification. The messages may include the original problem formulation and any additional update messages on global information, such as new solutions and cutting planes.

Verification of a Parent

Figure 9:
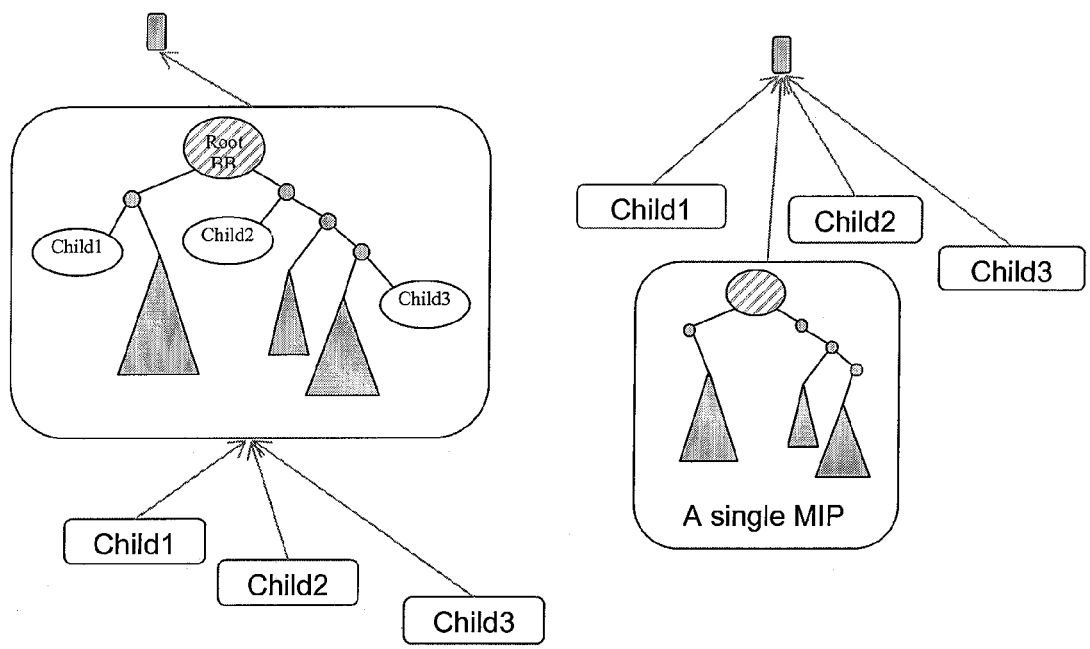
FIG. 9 illustrates a method of verifying a parent node by converting it into a child-only position.

Verifying a parent is much more difficult than verifying a child, since it may have further disseminated some sub problems. In order to verify a parent the original problem $MIP_{orig}$ (see also FIG. 5) and all of its disseminated child $MIP_{branch}$ problems should be known. Based on the methods explained in the section Subtracting MIP problems it may be possible to formulate the problem solved by the parent in a single MIP problem. FIG. 9 shows an illustrative example, where the nodes of the BB tree solved by the parent node are marked. Finally $MIP_{comp}$ may be sent to the user selected for verification along with the additional update message on global information with the same timing.

Methods for Finding Malicious Users

Where the invention is run as a public system it may be desirable to extend the messages between the parent and children with all necessary information to be able to later prove improper behavior. Each sent message may be time stamped and signed with a cryptographic signature, while each received messaged may be acknowledged with a time stamped and cryptographic signature on the message. The parent and the children may store these messages until compensation for the job is not approved by the TTP. If there is any suspicion on improper behavior the parent or child can send all of the messages sent and received from the suspect user. The amount of information sent at finishing a computation of the MIP problem may be a compromise between the efficiency of calculation and discovering malicious users. In one example case the whole branch and bound tree (with the solution, time stamp and branching information in each node) may be sent back, which could lead to unacceptably huge traffic load on the network. Instead, it may be desirable to send aggregated information regarding branches of the subtree, and optionally detailed information on the path in the branch tree to the best solution and to each retransmitted branch. The aggregated information on each branch may contain the number of nodes, the number of leaves, the number of infeasible leaves, the best upper and lower bounds. The branch tree information may depend on the depth of the tree, which may be polynomial compared to the size of the input. According to the information on the branch the parent user may roughly verify if the cost and results are correct. The maximum memory size of the branch tree may also be sent back, which may be an important factor when the results are sent to the other user as duplication.

Figure 10:
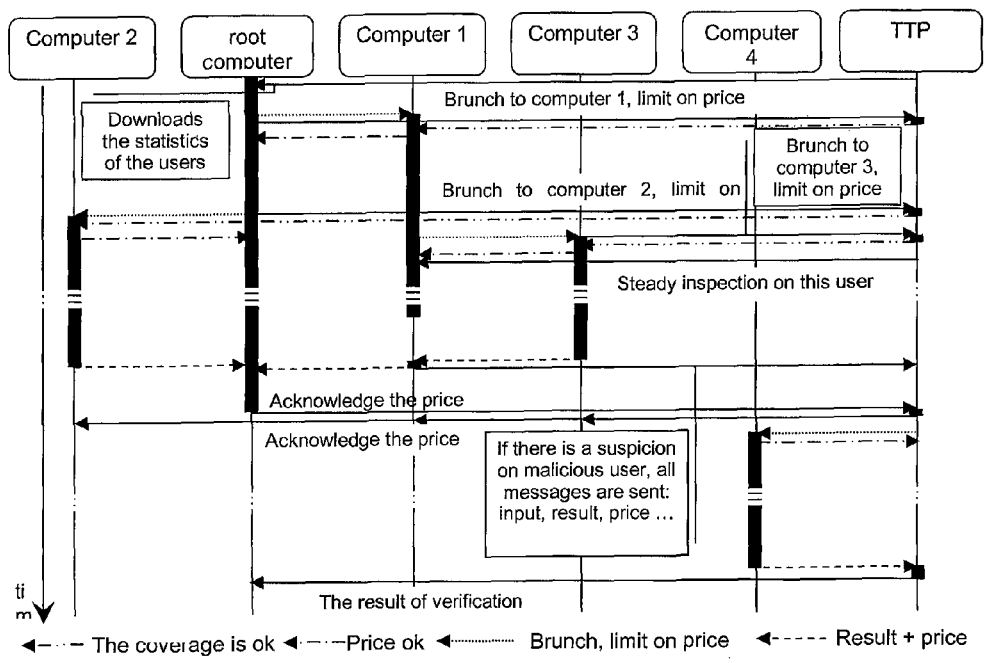
FIG. 10 illustrates an example of messages sent between the users and a trusted third party.

The parent user may send a request to the Trusted Third Party (TTP) to verify the result obtained by its child user, either due to a decision of the TTP (due to steady inspection) or a decision of the parent user (a suspicion on malicious user). The TTP may randomly select a child computer with satisfactory memory units to perform the verification. The TTP may have all the records on the change of global values with timestamps and the messages may be simulated in order to facilitate a fair comparison. Finally the central unit may analyze and compare the branch tree information and may if necessary increase the corresponding redundancy factor and update the probability of incorrect results or over-billing. Finally the bank may reimburse the price to the parent (see also FIG. 10 as an example). Since the child was assigned randomly by the TTP any constipation is expellable and the child's efficiency factor can be updated as well.

Network Architecture

To facilitate accounting for the computation there may be required to be a central unit, the TTP, which manages the accounts of each user ("bank"), and controls the correctness of billing for the jobs ("police").

The main purpose of bank may be to manage an account for each business user entity (it can be a single user or a group of friends) on the amount of electronic token they have and can spend on requesting calculations from the other users. It may require high security, authentication and cryptography units in the software.

The goal of police may be to maintain a database on the statistics of each P2P user, which contains:

Efficiency factor, which may represent the user's past performance in computing MIP problems. The performance may be a function of the computational speed (runtime) and the efficiency in branching the MIP, and the size increase of $MIP_{comp}$ it returns (which depends on the efficiency in estimating the problem size). As a result, the efficiency factor may depend on the computational power (e.g. size of memory and speed of CPU) of the computer, the performance of the solver (it can be from any vendor) and the efficiency on parallel distributing the problem. The efficiency factor may define the amount of electronic token the user receives for solving an MIP branch, which is the processing time multiplied with its efficiency factor. When a computer registers to the network it may receive a problem instant to be solved, and according to its performance it may be registered with an efficiency factor. A change in the efficiency factor can be requested by the user, or according to statistics gained by the TTP. The efficiency factor may have a key role in defining the price of each solved problem instance.

Service factor, which may define how the user can be trusted. The probability required to send the same problem instance to other computer may equal 1−service factor. It may depend on how often in the past the user has sent back a non-optimal solution instead of the optimal solution, and how often the users has reported the calculation to be longer than it was in reality, or how often the user dropped the connection in the middle of calculation and never finished the job. The service factor for a newly registered user may be 0 at the beginning since the network has no record and the user may not be trusted. After solving a problem instance successfully it is may increase, however it may always remain less than 1. The electronic token the user receives for solving an MIP may strongly depend on the service factor.

Life Cycle of a Problem

When a user logs into the network it may send an introductory message to the TTP, and may gather as many neighboring computers as possible. Each computer in the network may be in one of the following states:

free_for_work, when it is available for solving any MIP problem calculate, when it is working on an MIP (but does not have any child), parent_and_calculate, when it is working on an MIP and it also has children that are working on sub-problems assigned by him.

parent_only, when it has finished working on the problems, however it has some children working on sub-problems.

The status of each computer may be disseminated to the neighbors. The SIP protocol may be used for sending messages and maintaining user status. The SIP protocol may be mainly used in P2P chat clients. The libjingle google talk chat client [13] may be used.

The root relaxed problem may first be solved when a user starts a new optimization problem. Next, the necessary transformation on the problem for privacy preservation may be applied. After a predefined minimum amount of time has passed the user may invite children to join the optimization. During this time a depth search of BB tree may be suggested and by the end of it the user may have some knowledge on the minimum size of the problem.

Based on the solution time limit and the estimation of the problem size the user may decide to invite children, and select sub-problem to send (possibly the active nodes closest to the root). To select a child the user may use the statistical records of TTP. When a MIP is sent the message may also contain the maximum price the parent user is willing to pay for the optimal solution (denoted as price_limit). The MIP problem instances may be sent through the file transfer option of a chat client.

The TTP may inform and assure the child P2P computer that the parent P2P is able to cover the maximum price defined. During the calculation the TTP may randomly decide if the results should be verified by a second child user as a part of steady inspection, and may inform the parent of the decision. This verification may take place after the child user has finished its calculation.

The child user may be limited to a maximum of price_limit of electronic token for its calculation. In case a child user retransmits a sub-branch, it becomes a parent user as well, and it may have to share the price_limit electronic token with its new child. In this way, the electronic tokens may be distributed in the hierarchy and there may be required to be a mechanism to reapportion the electronic tokens, in case child reaches the limitation.

When a child user receives an MIP problem instant from a parent user, the parent and child may negotiate the price of a unit of calculation time, and the child may start the calculation. The price of calculation time may depend on the record of statistics of the child user. After the calculation is finished the child may send back the result and the amount of processing time it has spent on solving the problem. If a second child was randomly chosen to verify the results the parent user may forward the obtained result for the TTP. The central unit may later inform the parent user on the result of verification. There may be another mechanism to find the malicious users, which may be initiated by the parent user after finding the price of the work unfair or the solution suspicious. In this case the parent user may forward the result to the TTP. The amount of electrical tokens credited to the child may be service_factor*negotiated_price_of_time_unit*time_spent_on_calucaltion.

Security

In a network of the present invention each user may run a simple application on their computer, which can solve a branch of the branch-and-cut tree (e.g. an MIP) problem for any user in the network (since the transfer of the mathematical problems are just data—mathematical expressions—and not an executable process). In such a way the user can be sure that the calculation done at his computer can not spy or destroy any of his personal data.

This is not trivial when processes are disseminated in the network and it is hard to guarantee what kind of task is processed on each computer.

The MIP problems may be sent in MPS format, which is an industry format for MILP. Most of the MILP solvers can load MIP problems in MPS format, facilitating a very simple way of assemble any solver into the system. Besides loading MIP problems, the solver may be required to be able to save any sub-problem in MPS format, and the node selection method of the branch-and-bound algorithm may be required to be partially controlled for load balancing purposes. Most of the MILP solvers allow using external LP solver, and through this interface any sub-problem MPS problem can be saved. As a result due to the simple nature of choosing sub-trees for dissemination, the current invention can be assembled to most of MILP solvers through their application programming interface.

Further Application Example—The Client Puzzle

Establishing a market on computation power may have a very important effect on future internet technology. Most of the internet security and cryptographic methods are based on the difficulties in solving computationally complex problems. With a market on computation power one can get a very clear picture on the efficiency of these methods, and these facilitates developing many new methods. Such an example is the "client puzzle". Client puzzle (CPP) may be used to reduce spam e-mail messages as well as other attacks like Denial of Service in the network. The idea of the CPP can be applied such that all clients connecting to a server may be required to correctly solve an MIP (sub) problem before establishing a connection. Legitimate users would experience just a negligible computational cost, but abuse would be deterred: those clients that try to simultaneously establish a large numbers of connections would be unable to do so because of the required computational cost. Taking the advantage of this technique the users of the present invention can save some of the received solution (with their computational time), that is required to re-process for verification, however this verification is not time critical (e.g. it is part of steady inspection) and later they can be verified as client puzzles.

REFERENCES

[1] Ralph Edward Gomory and Ellis Lane Johnson, "Data Processing System For Finding Optimum Integer-Valued Solutions Of Linear Programs, Great Britain Patent Application GB19720007853, Aug. 7, 1974
[2] Mehrotra; Sanjay; et al., "Generalized branching methods for mixed integer programming", United States Patent Application 20060112049, May 25, 2006
[3] T. K. R., L. Ladányi, and M. J. Saltzman, "Parallel Branch, Cut, and Price for Large-scale Discrete Optimization", *Mathematical Programming* 98 (2003), 253
[4] Qun Chen, Michael Ferris and Jeff Linderoth, "FATCOP 2.0: Advanced features in an opportunistic mixed integer programming solver", Data Mining Institute Technical Report 99-11, Computer Sciences Department, University of Wisconsin, Madison, Wis., 1999.
[5] A. Holder, editor. *Mathematical Programming Glossary*. INFORMS Computing Society, http://glossary.computing.society.informs.org/, 2006-2007. Originally authored by Harvey J. Greenberg, 1999-2006.
[6] A. A. Chien, B. Calder, S. Elbert, and K. Bhatia, "Entropia: architecture and performance of an enterprise desktop grid system," Journal of Parallel and Distributed Computing, vol. 63, no. 5, pp. 597-610, 2003.
[7] Berkeley Open Infrastructure for Network Computing, url: http://boinc.berkeley.edu/
[8] Folding@home distributed computing project, url: http://folding.stanford.edu/English/Main
[9] Compute Against Cancer program, url: http://www.parabon.com/cac.jsp
[10] Fight AIDS At Home Computer Project, url: http://fightaidsathome.scripps.edu/
[11] url: http://fah-web.stanford.edu/cgi-bin/main.py?qtype=osstats
[12] Bau III, David & Trefethen, Lloyd N. (1997), Numerical linear algebra, Philadelphia: Society for Industrial and Applied Mathematics, ISBN 978-0-89871-361-9.
[13] Google Talk for Developers, url: http://code.google.com/apis/talk/libjing/http://en.wikipedia.org/wiki/Grid_computing-note-2

What is claimed is:

1. A method for solving at least one computationally significant problem on a distributed basis by means of a peer to peer network of associated and interconnected agent computers, wherein each agent computer may be in a parent relationship with one or more other agent computers ("parent computer") and in a child relationship with one or more other agent computers ("child computer") comprising the steps of:

(a) defining a computationally significant problem for solving at one or more of the agent computers as a series of sub-problems, such one or more agent computers being the first computer(s);
(b) providing a distributed processing management utility at each of the plurality of associated agent computers for enabling distributed solution of the problem;
(c) defining, by operation of the first computer's distributed processing management utility, one or more sub-trees for the problem using a branch and bound algorithm;
(d) recursively assigning each sub-tree to one of the agent computers, each agent computer being operable to solve the sub-tree and to define, by operation of its distributed processing management utility, one or more further sub-trees that are each assigned to one of the other agent computers for solving or defining of yet further sub-trees as required; and
(e) recursively:
(i) returning the result of each sub-tree solution to the agent computer that assigned the corresponding sub-tree; and
(ii) aggregating the sub-tree solutions on the agent computer that assigned the corresponding sub-trees to provide a solution to the sub-tree assigned to that agent computer;
until the first computer(s) aggregates the sub-tree solutions to provide a solution to the problem;
wherein each agent computer, depending on the distributed solution, communicates with its one or more parent computers and its one or more child computers;
each agent computer (whether a parent computer or child computer) can perform a sub-problem; and
using the distributed processing management utility each agent computer (whether a parent computer or child computer) can determine whether to assign sub-problems to other child computers and assign the sub-problems based on this determination.

2. The method of claim 1, wherein the plurality of associated agent computers is implemented using a peer-to-peer network.

3. The method of claim 1, wherein the problem is a mixed integer program.

4. The method of claim 1, comprising the further step of selecting an optimal solution from an aggregation of the solutions at the first computer(s).

5. The method of claim 1, wherein the further sub-trees are defined to help balance the load in the distributed network.

6. The method of claim 1, wherein the agent computers are organized in a hierarchy wherein each agent computer communicates only with a limited number of other agent computers, thereby providing scalability.

7. The method of claim 1, comprising the further step of monitoring and coordinating the solution of the problem across the network.

8. The method of claim 7, comprising the further step of determining an optimal number of agent computers for participation in solving the problem based on one or more attributes of the problem.

9. The method of claim 6, comprising the step of optimizing the hierarchy by merging an idle agent computer with another agent computer that assigned a sub-tree to the idle agent computer.

10. The method of claim 7, comprising the further step of defining a set of partial or initial results for the problem, providing these results to one or more of the agent computers, and upon receipt of such results modifying the solution of the problem based on such results.

11. The method of claim 1, wherein the problem is a first problem, comprising the further step of providing to each of one or more of the agent computers one of the sub-trees for the first problem and which corresponds to all of the unsolved branch and bound sub-trees.

12. The method of claim 6, comprising the further steps of (a) defining at the first computer(s) a time limit for solving the problem, and (b) adjusting load balancing based on the time limit.

13. The method of claim 1, wherein the problem includes integer-valued elements.

14. The method of claim 13, further comprising the step of defining a gap threshold, said gap threshold being the difference between a best found integer solution and a relaxed cost, wherein if the gap threshold is less than a predefined threshold, the sub-trees generated by an agent computer are solved on the agent computer and not sent to other agent computers.

15. The method of claim 7, comprising the further step of defining a minimum time limit that an agent computer must spend on solving the problem before it can distribute sub-trees to other agent computers.

16. The method of claim 7, comprising the further step of sending an existing sub-tree associated with an agent computer (parent computer) that has sent a job associated with the problem to one or more other agent computers (children computers), and providing this sub-tree to another agent computer, thereby preventing the loss of results from the children computers if the parent computer is not connected to the network.

17. The method of claim 7, comprising the further step of sending an existing sub-tree associated with a parent computer, and providing this sub-tree to another agent computer (grandparent computer) that sent one or more problem elements to the parent computer, thereby enabling the removal of the parent from the hierarchy once the parent computer has completed processing of the one or more problem elements.

18. The method of claim 7, wherein the first computer(s) includes or is linked to a progress agent operable to monitor and coordinate the solution of the computationally significant problem across the network.

19. The method of claim 18, said progress agent being operable on each agent computer to determine an optimal number of agent computers for solving the problem efficiently.

20. A system for solving at least one computationally significant problem on a distributed basis as a series of sub-problems, the system comprising a plurality of interconnected agent computers providing a distributed peer to peer network of computers, wherein each agent computer may be in a parent relationship with one or more other agent computers ("parent computer") and in a child relationship with one or more other agent computers ("child computer"):
 each agent computer including or being linked to a distributed processing management utility for enabling distributed solution of the problem;
 at least one agent computer being operable to define a computationally significant problem for solving by the distributed network, such agent computer being the first computer(s);
 the distributed processing management utility of each agent computer being operable to:
 (a) define one or more sub-trees for the problem, or for the sub-tree assigned to the agent computer, using a branch and bound algorithm;
 (b) assign each defined sub-tree to one of the agent computers, wherein each agent computer is operable to solve the sub-tree and to define, by operation of its distributed processing management utility, one or more further sub-trees that are each assigned to one of the other agent computers for solving or defining of yet further sub-trees as required;
 (c) return the result of each sub-tree solution to the agent computer that assigned the corresponding sub-tree; and
 (d) aggregate the sub-tree solutions corresponding to the sub-trees the agent computer assigned to other agent computers to provide a sub-tree solution corresponding to the sub-tree assigned to the agent computer;
 wherein the first computer(s) is operable to provide a solution to the problem by aggregating the sub-tree solutions from the agent computers it assigned sub-trees to
 wherein each agent computer, depending on the distributed solution, communicates with its one or more parent computers and its one or more child computers;
 each agent computer (whether a parent computer or child computer) can perform a sub-problem; and
 using the distributed processing management utility each agent computer (whether a parent computer or child computer) can determine whether to assign sub-problems to other child computers and assign the sub-problems based on this determination.

21. The system of claim 20, wherein the distributed network is implemented using a peer-to-peer network.

22. The system of claim 20, wherein the problem is a mixed integer program.

23. The system of claim 20, wherein the distributed processing management utility is operable at the first computer(s) to select an optimal solution from an aggregation of the solutions at the first computer(s).

24. The system of claim 20 wherein the distributed processing management utility is operable to recursively define the sub-trees as a plurality of sub-trees, each sub-tree being assigned to at least one of the agent computers.

25. The system of claim 20, wherein the distributed processing management utility is operable to add additional agent computers to the network when further computation helps balance the load in the distributed network.

26. The system of claim 20, wherein the distributed processing management utility is operable to organize agent computers in a hierarchy wherein each agent computer communicates only with a limited number of other agent computers, thereby providing scalability.

27. The system of claim 20, wherein the distributed processing management utility is operable to monitor and coordinate the solution of the problem across the network.

28. The system of claim 26, wherein the distributed processing management utility is operable to optimize the hierarchy by merging an idle agent computer with another agent computer that assigned a sub-tree to the idle agent computer.

29. The system of claim 27, wherein the distributed processing management utility is operable to define a set of partial or initial results for the problem, provide these results to one or more of the agent computers, and upon receipt of such results modify the solution of the problem based on such results.

30. The system of claim 26, wherein the distributed processing management utility is operable to (a) define at the first computer(s) a time limit for solving the problem, and (b) adjust load balancing based on the time limit.

31. The system of claim 27, wherein the distributed processing management utility is operable to send an existing sub-tree associated with a parent computer, and provide this sub-tree to another agent computer (grandparent computer) that sent one or more problem elements to the parent computer, thereby enabling the removal of the parent from the hierarchy once the parent computer has completed processing of the one or more problem elements.

32. The system of claim 27, wherein the distributed processing management utility further comprises or is linked to a progress agent operable to monitor and coordinate the solution of the computationally significant problem across the network.

33. A computer program for enabling solution of at least one computationally significant problem on a distributed basis, the computer program comprising computer instructions which when made available to each of a plurality of interconnected agent computers provides on each of the agent computers a peer-to-peer utility, the agent computers thereby defining a distributed network of computers for solving the problem; wherein each agent computer may be in a parent relationship with one or more other agent computers ("parent computer") and in a child relationship with one or more other agent computers ("child computer"):

wherein the peer-to-peer utility is operable to enable at one or more of the agent computers definition of a computationally significant problem for solving by the distributed network as a series of sub-problems, such agent computers being the first computer(s);

and wherein the peer-to-peer utility includes a distributed processing management utility operable to:

(a) define one or more sub-trees for the problem using a branch and bound algorithm;

(b) recursively assign each sub-tree to one of the agent computers, wherein each agent computer is operable to solve the sub-tree and to define, by operation of its distributed processing management utility, one or more further sub-trees that are each assigned to one of the other agent computers for solving or defining of yet further sub-trees as required; and (c) recursively:

(i) return the result of each sub-tree solution to the agent computer that assigned the sub-tree; and (ii) aggregate the sub-tree solutions on the agent computer that assigned the sub-trees to provide a solution to the sub-tree assigned to that agent computer;

until the first computer(s) aggregates the sub-tree solutions to provide a solution to the problem wherein each agent computer, depending on the distributed solution, communicates with its one or more parent computers and its one or more child computers;

each agent computer (whether a parent computer or child computer) can perform a sub-problem; and using the distributed processing management utility each agent computer (whether a parent computer or child computer) can determine whether to assign sub-problems to other child computers and assign the sub-problems based on this determination.

34. The computer program of claim 33, wherein the peer-to-peer utility is implemented using a peer-to-peer network.

35. The computer program of claim 33, wherein the problem is a mixed integer program.

36. The computer program of claim 33, wherein the peer-to-peer utility is operable at the first computer(s) to select an optimal solution from an aggregation of the solutions at the first computer(s).

37. The computer program of claim 33, wherein the peer-to-peer utility is operable to add additional agent computers to the network when further computation helps balance the load in the distributed network.

38. The computer program of claim 33, wherein the peer-to-peer utility is operable to organize agent computers in a hierarchy wherein each agent computer communicates only with a limited number of other agent computers, thereby providing scalability.

39. The computer program of claim 33, wherein the peer-to-peer utility is operable to monitor and coordinate the solution of the problem across the network.

40. The computer program of claim 38, wherein the peer-to-peer utility is operable to optimize the hierarchy by merging an idle agent computer with another agent computer that assigned a sub-tree to the idle agent computer.

41. The computer program of claim 38, wherein the peer-to-peer utility is operable to (a) define at the first computer(s) a time limit for solving the problem, and (b) adjust load balancing based on the time limit.

42. The computer program of claim 39, wherein the peer-to-peer utility is operable to send an existing sub-tree associated with a parent computer, and provide this sub-tree to another agent computer (grandparent computer) that sent one or more problem elements to the parent computer, thereby enabling the removal of the parent from the hierarchy once the parent computer has completed processing of the one or more problem elements.

* * * * *